(12) United States Patent
Yasukawa

(10) Patent No.: US 8,472,297 B2
(45) Date of Patent: Jun. 25, 2013

(54) OPTICAL DISC APPARATUS, INFORMATION RECORDING METHOD, AND OPTICAL DISC

(75) Inventor: Takakiyo Yasukawa, Fujisawa (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/198,321

(22) Filed: Aug. 4, 2011

(65) Prior Publication Data

US 2012/0075975 A1 Mar. 29, 2012

(30) Foreign Application Priority Data

Sep. 24, 2010 (JP) ................................. 2010-213714

(51) Int. Cl.
*G11B 20/10* (2006.01)
(52) U.S. Cl.
USPC ...................................... 369/59.11; 369/47.51
(58) Field of Classification Search
None
See application file for complete search history.

(56) References Cited

U.S. PATENT DOCUMENTS

| | | | |
|---|---|---|---|
| 2003/0067857 A1 | 4/2003 | Shirota et al. | |
| 2006/0140094 A1* | 6/2006 | Tabata et al. | 369/59.1 |
| 2009/0310458 A1 | 12/2009 | Nishimura et al. | |
| 2012/0026852 A1* | 2/2012 | Furumiya | 369/59.11 |

FOREIGN PATENT DOCUMENTS

| | | |
|---|---|---|
| JP | 2003-085753 | 3/2003 |
| JP | 2009-283095 | 12/2009 |

* cited by examiner

*Primary Examiner* — Paul Huber
(74) *Attorney, Agent, or Firm* — McDermott Will & Emery LLP

(57) ABSTRACT

The invention prevents mark distortion during high-speed recording on an optical disc, thereby improving recording performance. A write pulse signal includes mark periods during which marks 201 are formed and space periods during which no marks are formed. Particular mark periods include a top pulse 101 having first write power Pw; a bias pulse 102 that follows the top pulse 101 and has bias power Pm lower than the first write power Pw; and a last pulse 103 that follows the bias pulse 102 and has second write power Pl lower than the first write power Pw.

7 Claims, 7 Drawing Sheets

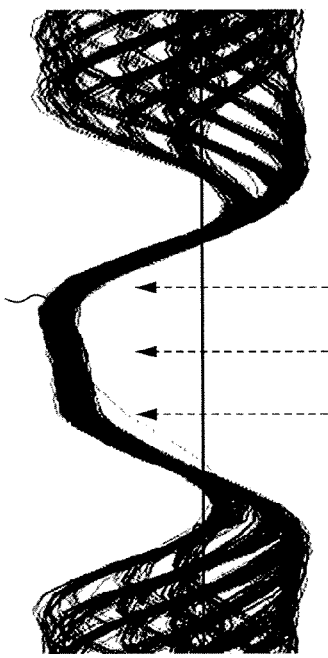
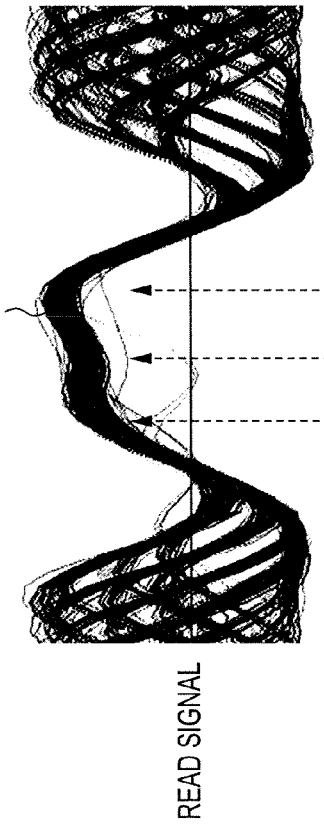
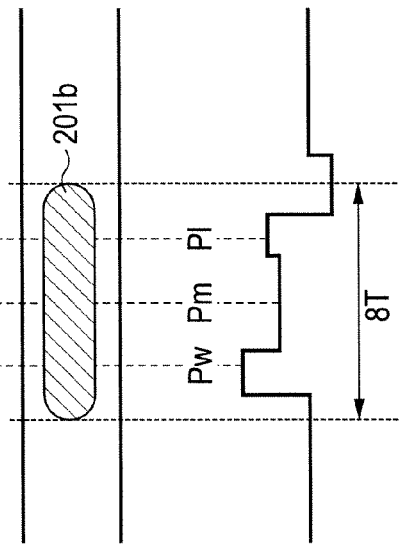
FIG. 3A CONVENTIONAL EXAMPLE
FIG. 3B EMBODIMENT 1

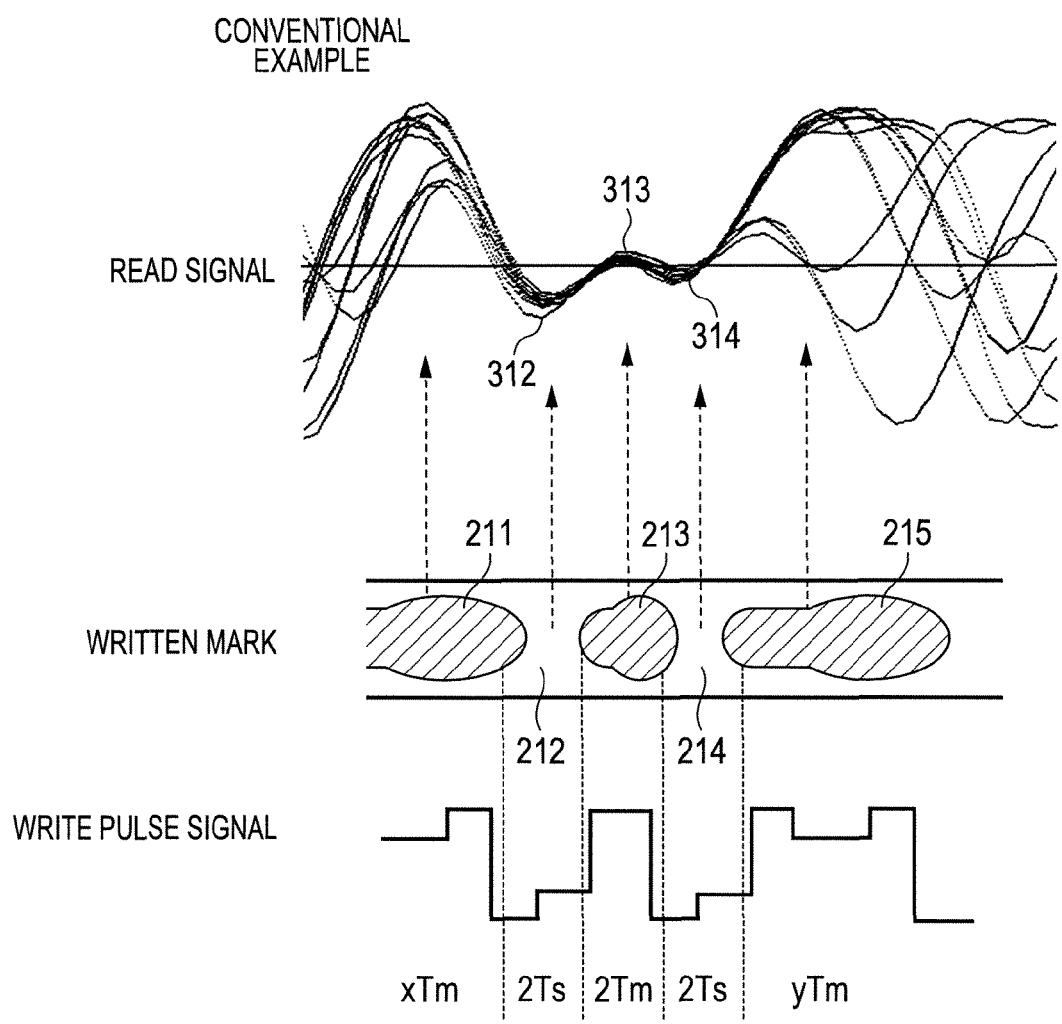

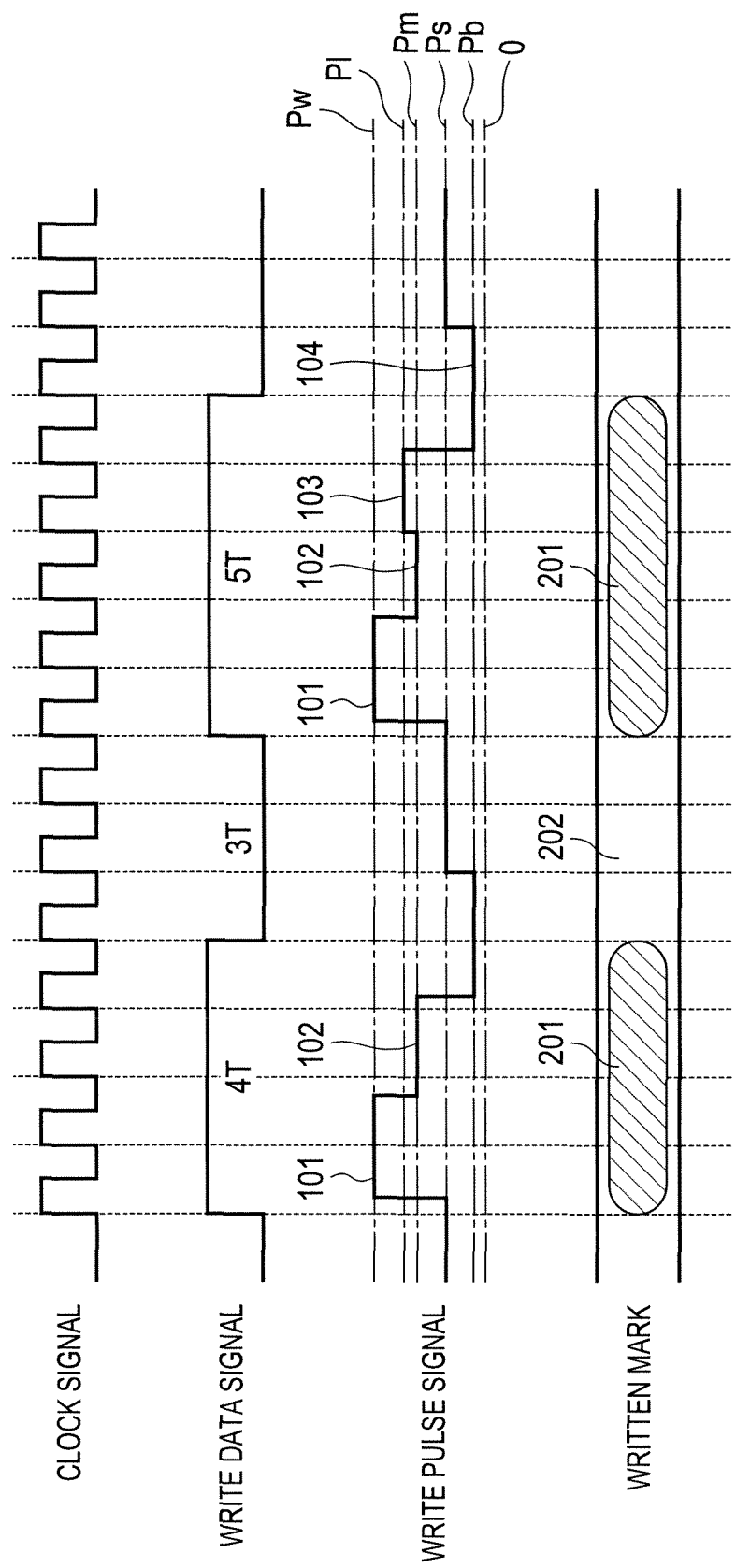

FIG. 7

| ITEM | | POWER VALUES RECORDED ($\varepsilon$: PERCENTAGE) | |
|---|---|---|---|
| | | CONVENTIONAL | EMBODIMENT 4 |
| TOP-PULSE PART (OR MONOPULSE) | WRITE POWER Pw (REFERENCE VALUE) | Pwo | Pwo |
| BIAS-PULSE PART | BIAS POWER Pm | $\varepsilon M$ | $\varepsilon M$ |
| LAST-PULSE PART | WRITE POWER Pl | | $\varepsilon L$ |
| COOLING PART | BOTTOM POWER Pb (COOLING POWER Pc) | $\varepsilon C$ | $\varepsilon C$ |
| SPACE PART | SPACE POWER Ps | $\varepsilon S$ | $\varepsilon S$ |

…

OPTICAL DISC APPARATUS, INFORMATION RECORDING METHOD, AND OPTICAL DISC

CLAIM OF PRIORITY

The present application claims priority from Japanese patent application serial No. JP 2010-213714, filed on Sep. 24, 2010, the content of which is hereby incorporated by reference into this application.

BACKGROUND OF THE INVENTION (1) Field of the Invention

The present invention relates to an optical disc apparatus, an information recording method, and an optical disc that are employed to record information using laser light and particularly to a recording technique suitable for high-speed recording.

(2) Description of the Related Art

Optical discs are information recording media on/from which information can be written/read. Write-once optical discs include CD-Rs, DVD-Rs, DVD+Rs, BD-Rs, and so forth. Optical discs that allow multiple recordings are, for example, CD-RWs, DVD-RAMs, DVD-RWs, DVD+RWs, and BD-REs. Especially high-capacity recording media are BDs (Blu-ray Discs), which involve the use of blue laser light for data recording/reading. For instance, 12-cm BDs can store 25-GB data per recording layer. Also, for the purpose of high-density recording, BDs adopt the data modulation method in which data lengths vary from 2 T to 9 T relative to the reference clock length 1 T.

To record information on an optical disc, the information is converted into a data stream having 2 T to 9 T data sets, and recording marks are formed based on the data stream. Often, one mark is formed using not one laser pulse but multiple short pulses. This method is called a write strategy and serves to prevent heat accumulation on the recording surface of the optical disc, thus allowing formation of accurate marks.

There are two types of write strategies: 1) N−1 write strategy and 2) castle write strategy.

1) In the N−1 write strategy, the number of write pulses is increased as the length of write data increases. For example, 2 pulses are used for forming a 3 T mark, and 3 pulses for a 4 T mark, and so on. Thus, the write pulses used for forming a 5 T or longer mark comprise a top pulse, multiple middle pulses, and a last pulse. In the case of BD-Rs and other write-once optical discs, the length of a top pulse is often made longer than those of other pulses in order to apply sufficient thermal energy, and the lengths of the subsequent multiple pulses and last pulse are set short enough to retain the applied thermal energy.

2) The castle write strategy uses a top pulse, a bias pulse (also called a middle pulse), and a last pulse. The top pulse has a given write power level, and the bias pulse has a write power level lower than that of the top pulse. The last pulse has a write power level which is equal to that of the top pulse. The middle bias pulse is used to retain thermal energy. Because the castle write strategy allows write pulse rise and fall times to be shortened, recording waveforms are less subject to deterioration. Thus, the castle write strategy is suitable for high-speed recording on BD-Rs and the like.

Such write strategies as above are disclosed in Japanese Laid-Open Unexamined Application No. 2003-85753, for example.

SUMMARY OF THE INVENTION

High-speed recording on optical discs entails problems as discussed below. When recording is performed on a BD at 8× write speed, for example, the write frequency is approximately 528 MHz, and the clock length 1 T is about 1.9 ns. When the N−1 write strategy is employed under this frequency, each pulse width becomes narrower than 1 ns even for a recording waveform of a relatively high duty of 50%, thus making it difficult to generate stable write pulses (i.e., difficult to achieve stable waveform rise/fall characteristics). When, on the other hand, the castle write strategy is employed, the write power of a last pulse is applied to the end section of a mark. This means that in the case of high-speed recording, the write power of the last pulse is more likely to be excessive, which may cause mark distortion. In addition, more heat may be diffused to the subsequent space, affecting high-speed recording quality.

Thus, one of the objects of the present invention is to provide an optical disc apparatus, an information recording method, and an optical disc that prevent mark distortion during high-speed data recording, thereby improving recording performance.

An optical disc apparatus according to the invention includes an optical pickup mechanism having a laser light source to irradiate an optical disc with laser light; a pulse generating circuit for generating a write pulse signal based on the information to be recorded; and a laser power control circuit for controlling the luminescent power of the laser light source based on the write pulse signal. The write pulse signal includes a mark period during which the mark is formed and a space period during which the mark is not formed. The mark period includes a top pulse having first write power Pw; a bias pulse that follows the top pulse and has bias power Pm lower than the first write power Pw; and a last pulse that follows the bias pulse and has second write power Pl lower than the first write power Pw.

An information recording method according to the invention comprises the steps of: generating a write pulse signal based on the information to be recorded; and driving a laser light source based on the write pulse signal to irradiate an optical disc with laser light. The write pulse signal includes a mark period during which the mark is formed and a space period during which the mark is not formed. The mark period include a top pulse having first write power Pw; a bias pulse that follows the top pulse and has bias power Pm lower than the first write power Pw; and a last pulse that follows the bias pulse and has second write power Pl lower than the first write power Pw.

Preferably, the second write power Pl for the last pulse is lower than the bias power Pm for the bias pulse.

Further, when the write pulse signal includes mark periods and space periods whose lengths are 2 T to 9 T relative to clock length T, 4 T or shorter mark periods each include only the top pulse or both of the top pulse and the bias pulse, and 5 T or longer mark periods each include the top pulse, the bias pulse, and the last pulse.

An optical disc according to the invention is designed such that when a write pulse signal used for forming marks based on the information to be recorded includes a top pulse, a bias pulse, and a last pulse in this order, the optical disc stores, as disc management information, the values of: first write power Pw for the top pulse; bias power Pm for the bias pulse that is lower than the first write power Pw; and second write power Pl for the last pulse that is lower than the first write power Pw.

In accordance with the present invention, it is possible to prevent mark distortion during high-speed recording and thereby achieve stable recording.

BRIEF DESCRIPTION OF THE DRAWINGS

These and other features, objects, and advantages of the present invention will become more apparent form the following description when taken in conjunction with the accompanying drawings wherein:

FIG. 3A illustrates a playback waveform obtained by reading a mark which was recorded at high speed with the use of conventional write pulses;

FIG. 3B illustrates a playback waveform obtained by reading a mark which was recorded at high speed with the use of write pulses according to the invention;

FIG. 4 illustrates a playback waveform obtained by reading spaces recorded at high speed;

FIG. 6 illustrates a write pulse signal according to Embodiment 3 of the invention; and FIG. 7 shows an example of write pulse parameters to be stored on an optical disc.

DETAILED DESCRIPTION OF THE EMBODIMENTS

Embodiments of the present invention will now be described with reference to the accompanying drawings.

Figure 1:
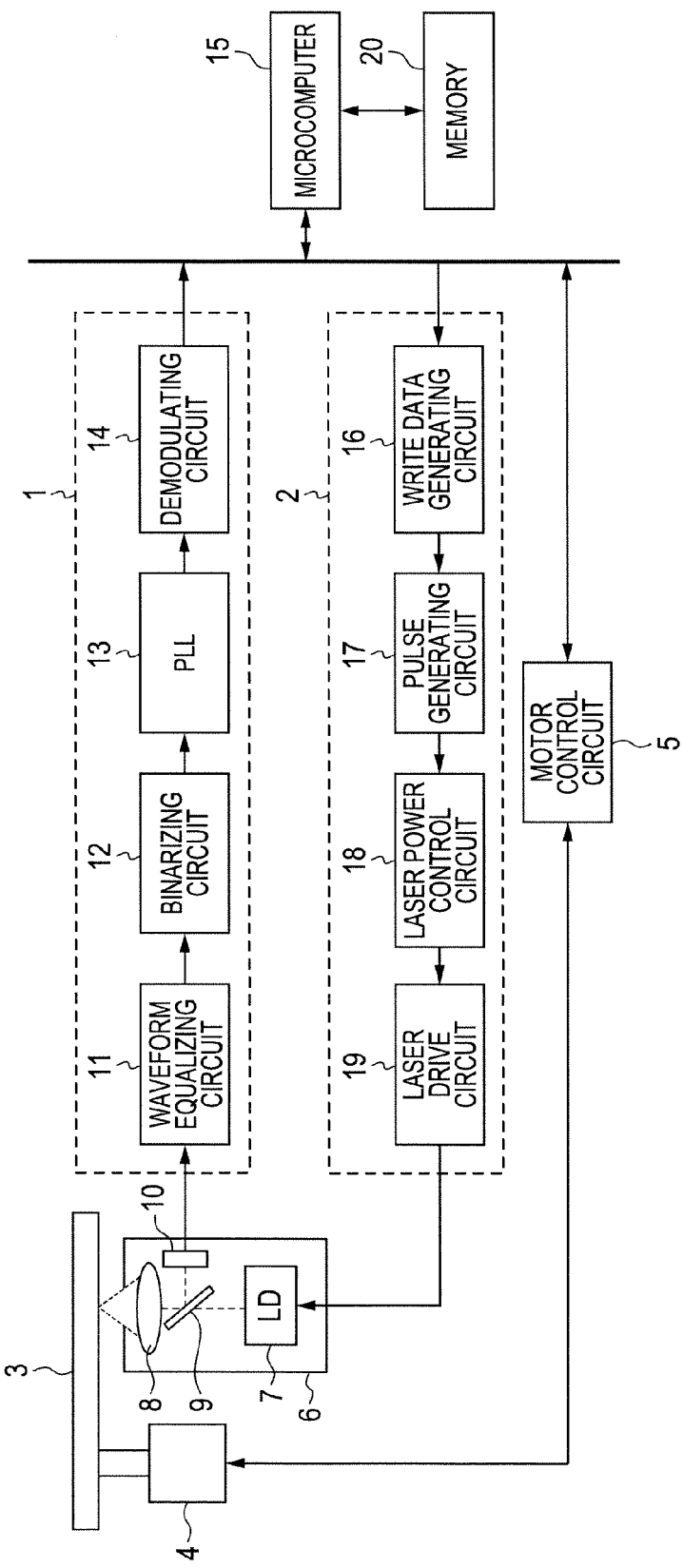
FIG. 1 is a block diagram illustrating an optical disc apparatus according to an embodiment of the invention.

FIG. 1 is a block diagram illustrating an optical disc apparatus according to an embodiment of the invention. The optical disc apparatus includes the following components: an optical pickup mechanism 6 for irradiating an optical disc 3 with laser light; a read signal processor 1 for processing read signals; and write signal processor 2 for processing write signals. The optical disc 3 is fixed to a spindle motor 4 and rotated by a motor control circuit 5 at a desired rotational speed. The optical pickup mechanism 6 includes a laser light source (LD) 7, a condenser lens 8, a beam splitter 9, and a photodetector 10. The read signal processor 1 includes a waveform equalizing circuit 11, a binarizing circuit 12, a PLL (phase-lock loop) 13, and a demodulating circuit 14. The write signal processor 2 includes a write data generating circuit 16, a pulse generating circuit 17, a laser power control circuit 18, and a laser drive circuit 19. A microcomputer 15 controls the entire operation of the apparatus, thereby reading/writing information from/on the optical disc 3.

Upon data writing, the write data generating circuit 16 modulates the data with the use of a given modulation method to generate a write data signal, and the pulse generating circuit 17 generates a write pulse waveform suitable for the optical disc 3. The write pulse waveform includes mark periods during which recording marks are formed and space periods during which no recording marks are formed, and it has multiple write pulses to form one mark. As pulse management information, the optical disc 3 stores write pulse codes suitable for the disc 3, so that the pulse generating circuit 17 can refer to the codes in forming the write pulses. It is instead possible to use write pulses adjusted by the apparatus itself or to use fixed write pulses.

The laser power control circuit 18 sets and controls laser power based on the levels of the write pulses generated by the pulse generating circuit 17. In doing so, the laser power control circuit 18 can refer to the codes stored on the optical disc 3, as in the case of the pulse waveform generation. It is instead possible to use laser power adjusted by the apparatus itself or to use fixed write power.

The pulse generating circuit 17 and the laser power control circuit 18 have, as default values, such values as mentioned above to compensate laser pulse widths or laser power based on phase shifts detected by the PLL 13. The laser drive circuit 19 drives the laser light source 7 based on the compensated laser pulse widths and laser power. As a result, the laser light source 7 emits the laser light that is in accordance with the write pulse waveform, which is directed onto the optical disc 3.

The microcomputer 15 stores on a memory 20 information necessary for the write pulse generation. For example, verified write parameters may be stored on the memory 20 before the shipment of the optical disc apparatus, so that the parameters can be read and set at the time of recording. Such write parameters may also be stored on a disc-by-disc basis. Alternatively, write parameters suitable for the optical disc 3 may be embedded in the groove area or the like of the disc 3, so that the apparatus can read the parameters from the disc 3 when loaded and set them for the write signal processor 2.

Upon data reading, an optical signal is extracted from the optical disc 3 via the condenser lens 8 and the beam splitter 9 and then converted into an electric signal by the photodetector 10. The electric signal is input to the waveform equalizing circuit 11, where, for the purposes of AC coupling, signal amplitude adjustment, and noise removal, given frequency ranges of the signal are emphasized to efficiently acquire particular signal components. Thereafter, the binarizing circuit 12 performs binarization using the average of the signal levels as its reference (slice level). The PLL 13 then performs timing correction on the resultant binarized signal based on the write clock. The demodulating circuit 14 performs demodulation on the binarized signal to restore information (read data).

Write pulse signals according to the invention will now be described along with their detailed embodiments.

Embodiment 1

Figure 2:
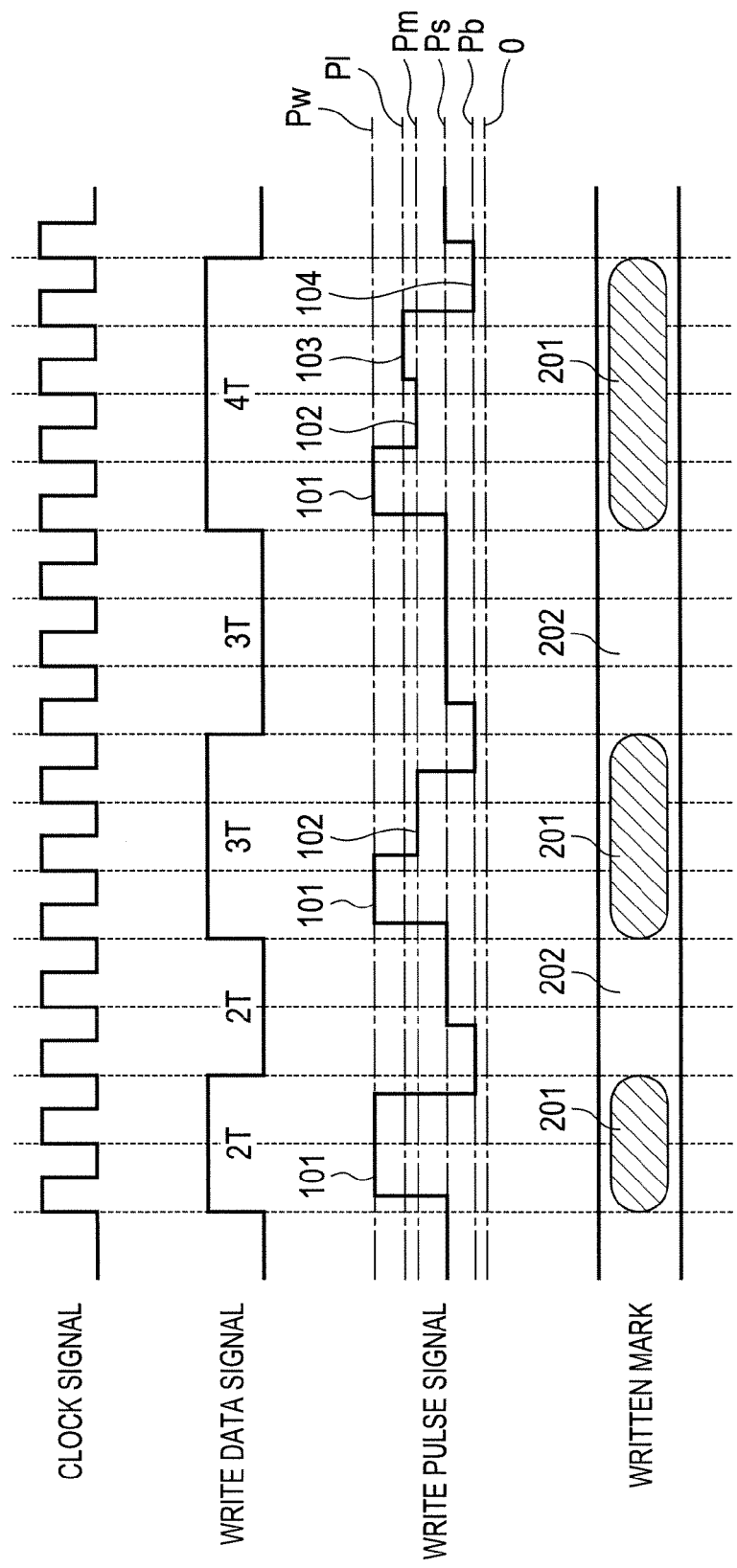
FIG. 2 illustrates a write pulse signal according to Embodiment 1 of the invention.

FIG. 2 illustrates a write pulse signal according to Embodiment 1 of the invention. The figure shows the relationships between the write pulse signal and recording marks with respect to a typical write data signal when a clock signal is used as a reference. The write data signal has mark and space lengths of 2 T, 3 T, and 4 T. The write data signal is generated by the write data generating circuit 16 of FIG. 1, and the write pulse signal by the pulse generating circuit 17. The write data signal is used to form marks 201 on the optical disc 3, and the resultant spaces between the marks 201 are recording spaces 202.

To record the 4 T mark of the data signal, a castle write waveform is used, and it consists of four write pulses: a top pulse 101, bias pulse 102, last pulse 103, and cooling pulse 104.

The top pulse 101 is used to form the front edge of a mark 201, and the laser power control circuit 18 applies write power Pw for the top pulse 101. The top pulse 101 serves to determine the position of the front mark edge.

The top pulse 101 is followed by the bias pulse 102, and bias power Pm lower than the write power Pw is applied for the bias pulse 102. The bias pulse 102 serves to retain the temperature of the recording film which has been changed by the top pulse 101. After the front edge of the mark 201 has been formed by the top pulse 101, the bias power Pm, lower than the write power Pw, is applied continuously to form the mark 201 having a relatively long mark length of 4 T.

The bias pulse 102 is followed by the last pulse 103. Applied for the last pulse 103 is write power Pl which is lower than the write power Pw for the top pulse 101 and higher than the bias power Pm for the bias pulse 102. The last pulse 103 serves to determine the position of the back edge of the mark 201. The reason the write power Pl is set lower than the write power Pw for the top pulse 101 is to increase accuracy in shaping the back edge of the mark 201.

The last pulse 103 is followed by the cooling pulse 104, and bottom power Pb equivalent to read power is set for the cooling pulse 104. The cooling pulse 104 effectively prevents an increase in recording film temperature during the formation of the mark 201, thereby reducing unnecessary mark expansion (thermal diffusion).

To form the regions other than the marks 201, that is, to form the spaces 202, space power Ps, or auxiliary power, is applied. The space power Ps is substantially the same as or higher than the bottom power Pb and lower than the bias power Pm. The space power Ps is not high enough to change the thermal properties of the recording film, but serves as auxiliary power for the write power Pw when a next mark is to be formed.

The use of the above write pulses leads to an increase in the accuracy of mark positions and shapes.

In the case of the short 2 T and 3 T marks of the data signal that require short pulse lengths, the write pulse waveform to be used is not a castle write waveform, but only the top pulse 101 having the write power Pw or the two pulses consisting of the top pulse 101 and the bias pulse 102 having the bias power Pm.

When, in contrast, the data signal has mark lengths longer than 4 T, the length of the bias pulse 102 is adjusted according to the mark lengths. In the case of a 5 T mark, for example, 1 T (clock length) is added to the length of the bias pulse 102 used for a 4 T mark. By thus increasing the length of the bias pulse 102 by 1 T each time mark length is increased by 1 T, marks can be recorded accurately regardless of their mark lengths.

Discussed next are advantages resulting from the write pulse signal of Embodiment 1.

To record data on an optical disc, N−1 write waveforms or castle write waveforms are employed to impart thermal energy to the recording film, thereby changing the thermal properties of the film. As the write speed increases, however, the thermal change of the film becomes unable to respond to the write speed, which often results in the formation of distorted or incomplete marks. This phenomenon applies not only to high-speed recording but also to high-density recording, and its cause may be attributed to heat accumulation within the recording film.

Such mark distortion due to heat accumulation is more likely to occur during the formation of a long mark which requires application of large thermal energy. The following is an example of this.

FIGS. 3A and 3B illustrate waveforms obtained by reading marks 201a and 201b which were recorded at high speed. Typical write pulses were used in FIG. 3A, and the write pulses of Embodiment 1 were used in FIG. 3B. During the recording, data patterns were recorded on a BD-R LTH (Low to High) at 6× write speed, and read signals were extracted from long 8 T marks.

In FIG. 3A, where a typical castle write waveform was used, the amplitude level 301a of the read signal waveform increased when data was read from the back-edge section of the mark 201a. This is due to the width increase or distortion of the mark 201 near its back edge, which can be attributed to heat accumulation due to the write power Pw for the last pulse.

In FIG. 3B, where the write pulses of Embodiment 1 were used, the amplitude level 301b of the read signal waveform was prevented from increasing when data was read from the back-edge section of the mark 201b. Because the write power Pl for the last pulse was reduced, heat accumulation was also reduced, resulting in no distortion of the mark 201b.

In high-speed recording, a castle write waveform is generally more advantageous than an N−1 write waveform since the former has smaller power changes and allows easy thermal control of discs. However, a typical castle write waveform is designed to continuously apply bias power Pm to form the middle section of a mark; thus, subtle thermal changes of the recording film tend to accumulate. As a result, mark distortion is likely to occur at the back section of a long mark.

Also, in the case of a typical castle write waveform, the write power for the last pulse is set equal to the write power for the top pulse. Embodiment 1 of the invention, in contrast, is designed to lower the write power Pl for the last pulse than the write power Pw for the top pulse in the case of high-speed recording (e.g., 4 or 6× speed), thereby allowing formation of appropriately-shaped marks.

FIG. 4 illustrates a conventional playback waveform obtained by reading spaces which were recorded at high speed. During the recording, a conventional castle write waveform was used to record data patterns on a BD-R SL (Single Layer) at 10× write speed, and a read signal was extracted from three 2 T components (2 T space 212, 2 T mark 213, and 2 T space 214) that lie between a long xT mark 211 and a long yT mark 215.

As illustrated in FIG. 4, signal levels 312 and 314 extracted from the 2 T spaces 212 and 214, respectively, showed signs of fluctuation (i.e., the 2 T spaces 212 and 214 were shortened), and each of the 2 T spaces 212 and 214 was thus detected falsely as a 1 T space. Particularly noteworthy is the larger change in the signal level 314 of the subsequent 2 T space 214 than the change in the signal level 312 of the preceding 2 T space 212. The reason would be that the temperature increase of the recording film resulting from the formation of the mark 211 did not subside enough during the formation of the 2 T spaces 212 and 214. In other words, the thermal quantity for the formation of the mark 211 would have been excessive.

In that case, too, by adopting Embodiment 1 of the invention and thus lowing the write power for the last pulse in forming the mark 211, the recording film temperature can be reduced sufficiently during formation of the 2 T spaces 212 and 214, thereby allowing formation of appropriately-shaped spaces. As above, by reducing the write power for the last pulse, which is decisive in forming an appropriately-shaped mark, it is possible to reduce thermal influence on subsequent spaces and marks and thereby prevent read errors.

While the advantages of Embodiment 1 for BD-R discs have been discussed, Embodiment 1 is effective for other types of optical discs as well, on which high-speed recording is performed. Embodiment 1 is also effective for high-speed recording (e.g., 10×, 12×, or higher write speed).

Embodiment 2

Figure 5:
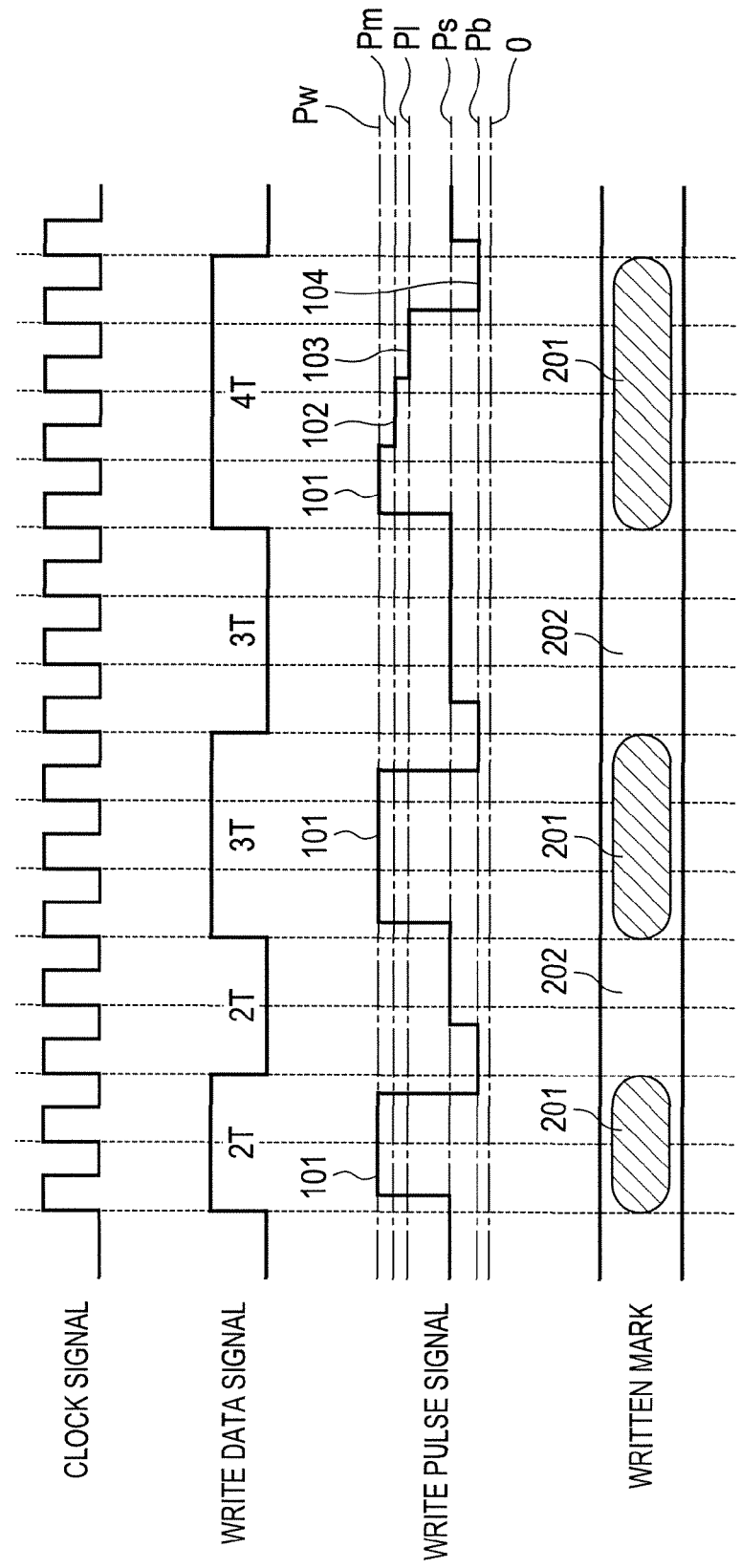
FIG. 5 illustrates a write pulse signal according to Embodiment 2 of the invention.

FIG. 5 illustrates a write pulse signal according to Embodiment 2 of the invention. The signal is basically the same in terms of single components as that of Embodiment 1 (see FIG. 2) and differs only in that the write power Pl for the last pulse 103 of a castle write waveform is set lower than the bias power Pm for the bias pulse 102.

In this embodiment as well, accurate marks can be formed in a stable manner, and thermal influence on subsequent spaces and marks can be reduced. Embodiment 2 is more suitable for faster and denser recording than in Embodiment 1, and either of Embodiments 1 and 2 can be employed depending on the write speed and the characteristics of the recording film.

In Embodiment 2, to form a 3 T mark, a waveform having only the top pulse 101 is used as in the case of a 2 T mark. It is of course possible to select a 2-pulse waveform as in Embodiment 1, depending on the characteristics of the recording film. That is, when the write speed needs to be increased and this is likely to affect formation of marks and spaces, a 2-pulse waveform as in FIG. 2 may be used in which the top pulse 101 is followed by the bias pulse 102 having lower power.

Embodiment 3

FIG. 6 illustrates a write pulse signal according to Embodiment 3 of the invention. The signal is basically the same in terms of single components as that of Embodiment 1 (see FIG. 2) and differs only in that each pulse length is extended relative to the clock length for the purpose of high-speed recording. In Embodiment 1, the top pulse 101 and the last pulse 103 of a castle write waveform are about 1 T long. In Embodiment 3, by contrast, their lengths are extended to about 1.2 to 1.5 T. FIG. 6 shows 4 T and 5 T marks as waveforms to be recorded. A castle write waveform is used to form the 5 T mark due to the extended pulse length, whereas a 2-pulse waveform having the top pulse 101 and the bias pulse 102 is used for the 4 T mark. For 6 T or longer marks, the length of the bias pulse 102 for the 5 T mark (i.e., the pulse having the bias power Pm) is extended by 1 T each time the mark length is increased by 1 T. In the case of 2 T and 3 T marks that require short pulse lengths, only the top pulse 101 having the write power Pw is used as in FIG. 5.

In Embodiment 3 as well, the write power Pl for the last pulse 103 is made smaller than the write power Pw for the top pulse 101. Thus, accurate marks can be formed in a stable manner, and thermal influence on subsequent spaces and marks can be reduced. Since Embodiment 3 is particularly designed such that each write pulse length is extended, stable write pulses can be generated during high-speed recording.

Embodiment 4

Preferably, write pulse parameters (write strategy) suitable for the above-described embodiments are embedded in the optical disc 3 as management information for the groove period and the like. The information to be embedded includes data on the powers, pulse lengths, and pulse positions for the top pulse 101, bias pulse 102, last pulse 103, cooling pulse 104, and spaces. When the optical disc 3 is loaded into the optical disc apparatus, the apparatus can read out such parameters from the disc 3 to set them for the write signal processor 2.

FIG. 7 shows an example of write pulse parameters to be stored on the optical disc 3. The figure shows how to describe the power values for the write pulses.

In the case of a castle write waveform, a conventionally adopted approach is to use the appropriate value Pwo of the write power Pw as a reference and describe the values of the bias power Pm, the bottom power Pb (also called the cooling power Pc), and the space power Ps relative to the value Pwo with the use of the percentage ϵ.

The description method of Embodiment 4, by contrast, uses as a reference value the appropriate value Pwo of the write power Pw for the top pulse 101 of a castle write waveform (or the appropriate value Pwo of monopulse write power for a 2 T mark) and describes, in addition to the above powers Pm, Pb (Pc), and Ps, the write power Pl (percentage ϵL) relative to the last pulse 103 of a castle write waveform. Thus, as shown in FIG. 7, the item "last-pulse part" is added to a description table which includes the conventional items "top-pulse part," "bias-pulse part," "cooling part," and "space part."

Such a write power description allows different write powers to be set for the top and last pulses. The resultant increase in the volume of information to be embedded in the optical disc 3 is small enough to be ignored.

The above parameter description is only meant to be an example. It is instead possible to use the write power Pl for the last pulse as a reference and express the other power values in percentage form.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus for irradiating an optical disc with laser light to form a mark based on information, the apparatus comprising:
   an optical pickup mechanism having a laser light source to irradiate the optical disc with laser light;
   a pulse generating circuit for generating a write pulse signal based on the information; and
   a laser power control circuit for controlling luminescent power of the laser light source based on a write pulse signal, wherein:
   the write pulse signal includes a mark period during which a mark is formed and a space period during which the mark is not formed,
   the mark period includes:
      a top pulse having first write power Pw;
      a bias pulse that follows the top pulse and has bias power Pm lower than the first write power Pw; and
      a last pulse that follows the bias pulse and has second write power Pl lower than the first write power Pw, and
   the second write power Pl of the last pulse is applied to an end section of the mark based on the information.

2. The optical disc apparatus according to claim 1 wherein the second write power Pl for the last pulse is lower than the bias power Pm for the bias pulse.

3. An information recording method for irradiating an optical disc with laser light to form a mark based on information, the method comprising steps of:
   generating a write pulse signal based on the information; and
   driving a laser light source based on the write pulse signal to irradiate the optical disc with laser light, wherein:
   the write pulse signal includes a mark period during which a mark is formed and a space period during which the mark is not formed,
   the mark period include:
      a top pulse having first write power Pw;
      a bias pulse that follows the top pulse and has bias power Pm lower than the first write power Pw; and
      a last pulse that follows the bias pulse and has second write power Pl lower than the first write power Pw, and
   the second write power Pl of the last pulse is applied to an end section of the mark based on the information.

4. The information recording method according to claim 3 wherein the second write power Pl for the last pulse is lower than the bias power Pm for the bias pulse.

5. The information recording method according to claim 3, wherein the mark period includes the top pulse, the bias pulse, and the last pulse when a length of the mark period is 5 T or longer relative to a clock length T.

6. The information recording method according to claim 3 wherein an end section of the mark period include a cooling pulse having bottom power Pb equivalent to read power.

7. An optical disc onto which laser light is radiated for recording information, wherein when a write pulse signal used for forming marks based on the information includes a top pulse, a bias pulse, and a last pulse in this order, the optical disc stores, as disc management information, values of:

first write power Pw for the top pulse;

bias power Pm for the bias pulse that is lower than the first write power Pw; and second write power Pl for the last pulse that is lower than the first write power Pw, and wherein the second write power Pl of the last pulse is applied to an end section of a mark based on the information.

\* \* \* \* \*